(12) United States Patent
Mani

(10) Patent No.: US 6,378,319 B1
(45) Date of Patent: Apr. 30, 2002

(54) MULTI-COMPARTMENT MULTI-CLIMATE DELIVERY VEHICLE

(75) Inventor: Daniel Mani, Los Angeles, CA (US)

(73) Assignee: The Mani Brothers, Los Angeles, CA (US)

( * ) Notice: Subject to any disclaimer, the term of this patent is extended or adjusted under 35 U.S.C. 154(b) by 0 days.

(21) Appl. No.: 09/699,171

(22) Filed: Oct. 27, 2000

(51) Int. Cl.$^7$ .................................................. B60H 1/32
(52) U.S. Cl. ............................................ 62/239; 62/244
(58) Field of Search ................................. 62/239, 244

(56) References Cited

U.S. PATENT DOCUMENTS

| | | | |
|---|---|---|---|
| 242,125 A | 5/1881 | Gurney | |
| 250,727 A | 12/1881 | Gurney | |
| 263,285 A | 8/1882 | Chase | |
| 1,501,660 A | 7/1924 | Helmer | |
| 1,950,599 A | 3/1934 | De More | |
| 2,406,241 A | 8/1946 | Morrison | |
| 2,617,270 A | 11/1952 | Ruth | |
| 2,633,714 A | 4/1953 | Wehby | |
| 2,677,244 A | 5/1954 | Wehby | |
| 4,505,126 A | 3/1985 | Jones et al. | |
| 4,831,837 A | 5/1989 | Negishi et al. | |
| 4,919,477 A | * 4/1990 | Bingham et al. | 296/24.1 |
| 5,029,450 A | 7/1991 | Takano et al. | |
| 5,054,295 A | 10/1991 | Goulooze | |
| 5,129,235 A | 7/1992 | Renken et al. | |
| 5,161,848 A | 11/1992 | Lutton | |
| 5,186,015 A | * 2/1993 | Roehrich et al. | 62/133 |
| 5,424,720 A | * 6/1995 | Kirkpatrick | 340/585 |
| 5,704,676 A | 1/1998 | Hill | |
| 5,819,550 A | 10/1998 | Saia, III et al. | |
| 5,934,092 A | * 8/1999 | Krompass et al. | 62/239 |
| 5,979,173 A | * 11/1999 | Tyree | 62/388 |

* cited by examiner

Primary Examiner—William E. Tapolcai
Assistant Examiner—Mohammad M. Ali
(74) Attorney, Agent, or Firm—Blakely, Sokoloff, Taylor & Zafman LLP

(57) ABSTRACT

A delivery vehicle having a room temperature compartment, a freezer compartment and a refrigerated compartment. The refrigerated compartment is adjacent to the freezer compartment. The refrigerated compartment has a shared wall with the freezer compartment, and the shared wall has a fan assembly that moves air from the freezer compartment to the refrigerated compartment. A control unit allows the driver to monitor and control the temperature in the freezer compartment and the refrigerated compartment from the driver area. A room temperature compartment may share air with the driver area. In one embodiment, the room temperature compartment may be separated from the driver area by a screen.

29 Claims, 3 Drawing Sheets

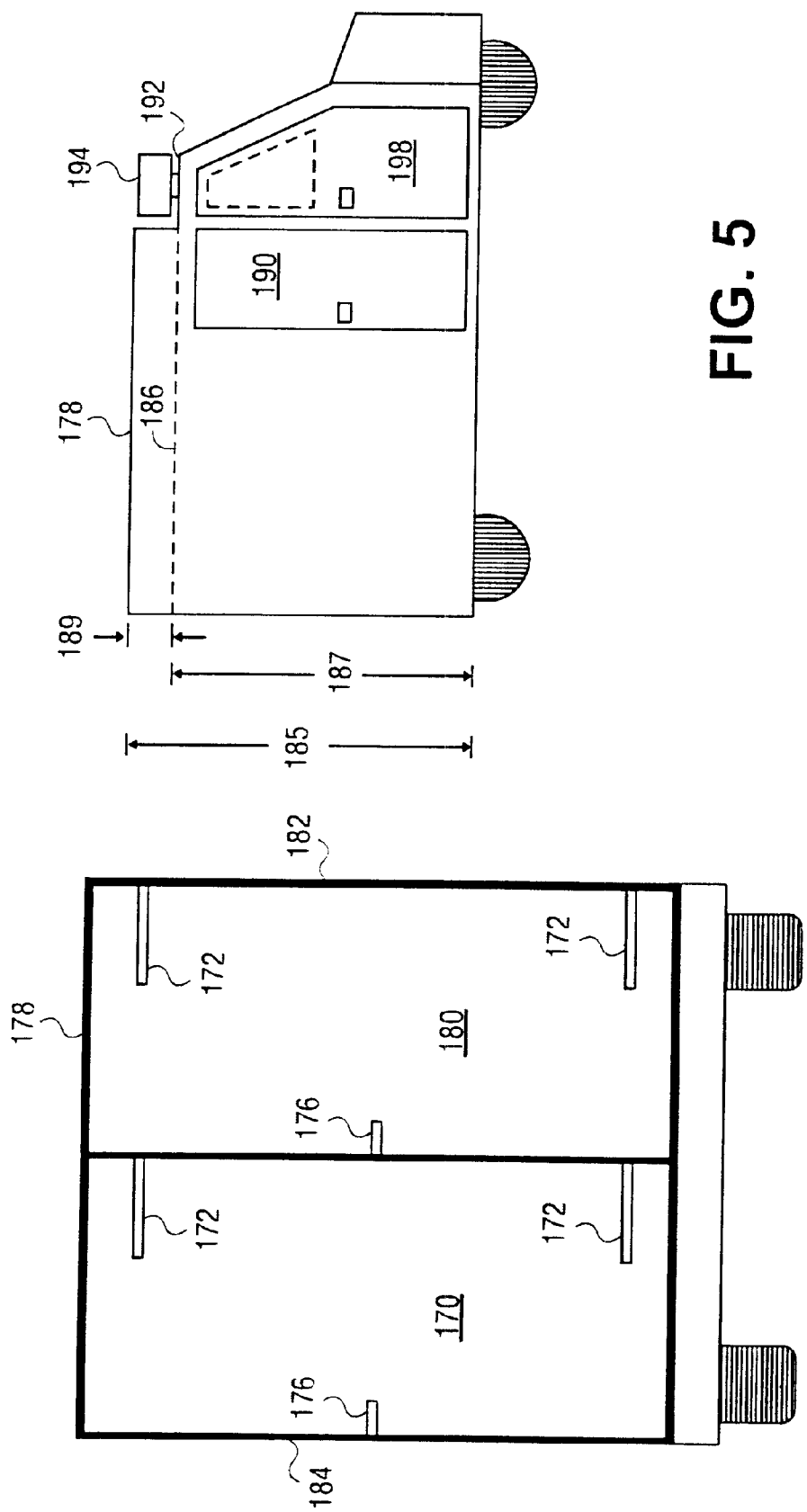

MULTI-COMPARTMENT MULTI-CLIMATE DELIVERY VEHICLE

FIELD OF THE INVENTION

The invention relates to delivery vehicles. More specifically, the invention relates to delivery vehicles that deliver frozen, refrigerated and room temperature goods.

BACKGROUND OF THE INVENTION

Historically, before the advent of supermarkets, butchers, milk men, bakers, fishmongers, ice men, and other food and goods vendors maintained separate stores. Traditionally, these purveyors delivered foods and goods to customers, typically at home, with a vehicle that suited their sole kind of food or goods. That is, the ice man delivered with a specialized vehicle for delivering frozen foods; the butcher delivered with a specialized refrigerated vehicle, etc. Supermarkets stock a plethora of foods and good, as intimated by the name itself. Supermarkets stock frozen foods, refrigerated foods, and room temperature foods and goods. In most places, supermarkets do not deliver, and/or patrons shop in the supermarket and transport purchases themselves. Therefore, until now, there has been no demand for a multi-compartment multi-climate delivery vehicle.

The increasing popularity of the Internet threatens to alter societal buying habits to an extent potentially even greater than the introduction of the supermarket. The Internet provides a virtual storefront through which shoppers of all kinds of foods and goods may place orders for delivery. A virtual supermarket that stocks room temperature goods and food, frozen foods, and refrigerated foods may be required to deliver foods and goods that must maintain their appropriate temperature during transport. A multi-compartment multi-climate delivery vehicle is needed to accommodate these deliveries.

Deliveries are made to supermarkets and other large entities by tractor-trailer rigs and other kinds of large delivery trucks. These trucks typically have single temperature storage for delivering one type of good, not unlike the purveyors of old. An example of such a truck is shown in U.S. Pat. No. 5,161,848. Some delivery trucks suited for making deliveries to supermarkets and other large entities have been developed to provide for multiple climates required by various foods and goods. However, such large delivery trucks are not suitable for delivery to homes and smaller businesses because of their size. Further, use of such large vehicles for home delivery is not practical because an inordinately large number of personal deliveries would have to be included to fill such large vehicles.

In addition, the systems taught by prior art multi-compartment multi-climate trailers cannot be effectively or efficiently deployed for use in home delivery vehicles. For example, the vehicle in U.S. Pat. No. 5,054,295 includes use of air conducting channels, heaters, and other features situated in the body of a trailer portion of a tractor trailer rig that are beyond the scope and kind of system useful a for home delivery vehicle. The extent of the heating and air cooling devices taught therein significantly detract from the amount of cargo space available if applied in a smaller vehicle for use in home delivery. Similarly, the system taught in U.S. Pat. No. 5,704,676 includes two separate air cooling units, one for a refrigerated compartment and a second for a freezer compartment. Again, the extent of the system significantly detracts from the amount of cargo space available if deployed in a home delivery vehicle. The prior art does not teach an effective system and method for a multi-compartment multi-climate delivery vehicle of the size and type needed to accommodate deliveries to homes and small businesses of the type disclosed herein.

SUMMARY OF THE INVENTION

A delivery vehicle having a room temperature compartment, a freezer compartment and a refrigerated compartment. The refrigerated compartment is adjacent to the freezer compartment. The refrigerated compartment has a shared wall with the freezer compartment, and the shared wall has a fan assembly that moves air from the freezer compartment to the refrigerated compartment. A control unit allows the driver to monitor and control the temperature in the freezer compartment and the refrigerated compartment from the driver area. A room temperature compartment may share air with the driver area.

BRIEF DESCRIPTION OF THE DRAWINGS

FIG. 4 is a rear view of the preferred embodiment of a delivery vehicle of the present invention.

FIG. 5 is a side view of the preferred embodiment of a delivery vehicle of the present invention.

DETAILED DESCRIPTION OF THE INVENTION

Figure 1:
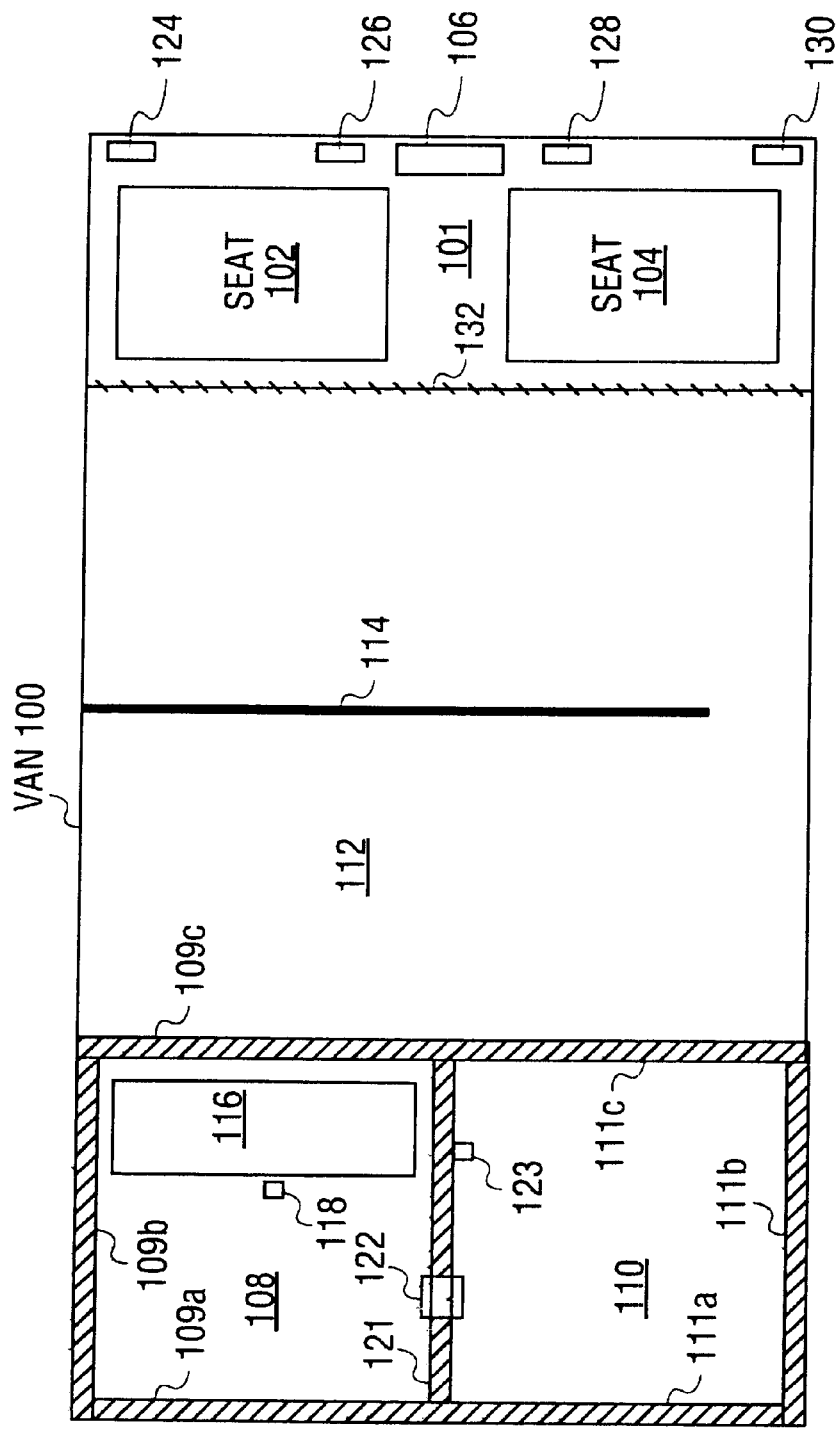
FIG. 1 is a top view of the preferred embodiment of a delivery vehicle of the present invention.

FIG. 1 is a top view of the preferred embodiment of a delivery vehicle of the present invention. In one embodiment, the delivery vehicle is a van such as van 100. However, other embodiments of this invention may be implemented on various vehicle formats including trucks, station wagons, etc. Van 100 may be a standard delivery van such as, for example, the Savanna model manufactured by the GMC division of General Motors Corporation of Pontiac, Mich. Van 100 includes seat 102 and seat 104 located in driver area 101. In one embodiment, the delivery vehicle may include a standard van cab, standard engine, standard drivetrain and a cargo area. In a version of the van designed for use in North America and other locales, seat 102 is the driver's seat, and seat 104 is a passenger or assistant's seat.

The cargo area of van 100 includes freezer compartment 108 and refrigerated compartment 110 and room temperature compartment 112. In most applications, it has been found that satisfactory results can be obtained when the freezer compartment is maintained at from 0° F. to 26° F., the refrigerated compartment is maintained at from 36° F. to 50° F., and the room temperature compartment is maintained, in one embodiment, at an ambient temperature that is comfortable to the driver, and may be, for example, from 62° F. to 82° F. In the embodiment shown, the driver or other occupant of the van may monitor and control the temperature of two of the compartments of the van via control unit 106 from seats 102 and/or 104. Control unit 106 allows the driver of the vehicle to monitor and control freezer compartment 108 and refrigerated compartment 110.

Freezer compartment 108 is enclosed by insulated walls 109a, 109b, 109c and 121 that extend from the floor of the van to the ceiling of the van. Freezer compartment 108 includes cooling unit 116 and temperature sensor 118. Cooling unit 116 may be a condenser freezing unit such as model 14 L-2 available from Advanced Temperature Control. Refrigerated compartment 110 is enclosed by insulated walls 111a, 111b, 111c and 121 that extend from the floor of the van to the ceiling of the van. Refrigerated compartment 110 includes temperature sensor 123.

Freezer compartment 108 shares a wall, wall 121, with refrigerated compartment 110. The shared wall, wall 121 includes one aperture which contains fan assembly 122. In another embodiment, wall 121 may include two or more apertures which each contain a fan assembly such that air may be directed from the freezer compartment to the refrigerated compartment. Fan assembly 122 prevents air from freezer compartment 108 from flowing into or seeping into refrigerated compartment 110 when the fan assembly is not on or is not activated. The fan assembly has two modes, on and off, but may also have two or more speeds at which a fan blade operates such that air may flow from the freezer compartment to the refrigerated compartment at different volumes. The freezer compartment 108 and refrigerated compartment 110 as shown have the same depth such that walls 111c and 109c may be portions of the same wall that extends from one side of van 100 to the other side of van 100. However, if desired, freezer compartment 108 and refrigerated compartment 110 may have different depths such that walls 109c and 111c are separate walls. In the embodiment shown, walls 109a and 111a are also the inside portion of doors that allow for external access to the freezer compartment and the refrigerated compartment.

Temperature sensors 118 and 123, which may be thermocouples or other suitable temperature measuring devices, and fan assembly 122 are each coupled to cooling unit 116. When the temperature in freezer unit 108 reaches or exceeds a maximum freezer temperature as sensed by temperature sensor 118, cooling unit 16 automatically activates. The maximum freezer temperature may be preset by, for example, the delivery company or the manufacturer. The maximum freezer temperature may also be set by the driver via control unit 106. In the preferred embodiment, temperature sensor 118 is coupled to control unit 106 such that control unit 106 displays the current freezer compartment temperature to the driver via a display screen included in control unit 106. The control unit 106 may also display the maximum desired freezer temperature on the display screen of the control unit.

When the temperature in refrigerated unit 110 reaches or exceeds a maximum refrigerated temperature as sensed by temperature sensor 123, fan assembly 122 automatically activates so that cooled air is directed from freezer compartment 108 to refrigerated compartment 110. The temperature sensor 123 may be coupled to fan assembly 122. When the fan assembly 122 automatically activates, cooling unit 116 may also concurrently automatically activate so that the air remains at the desired temperature in freezer compartment 108. In another embodiment, the temperature sensor 123 may be coupled to cooling unit 116 which is, in turn coupled to fan assembly 122. The maximum refrigerated temperature may be preset by, for example, the delivery company or the manufacturer. In another embodiment, the maximum refrigerated temperature may be set by the driver via control unit 106.

Figure 2:
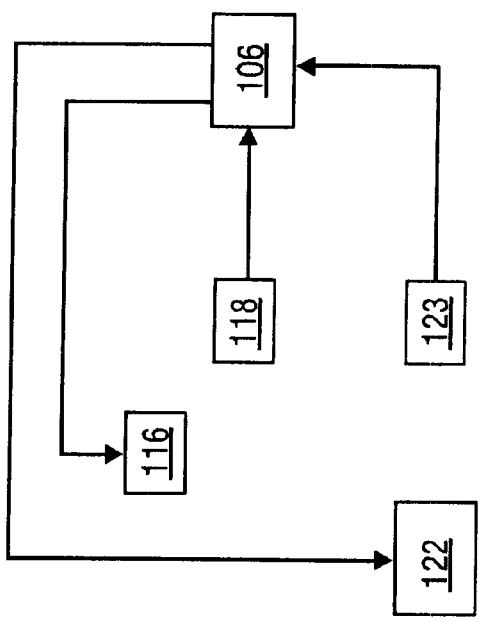
FIG. 2 is a general schematic of the temperature sensors, fan assembly, cooling unit and control panel of the preferred embodiment of the present invention.

FIG. 2 is a general schematic of the temperature sensors, fan assembly, cooling unit and control panel of the preferred embodiment of the present invention. In the preferred embodiment, control unit 106 is coupled to and serves as a control for fan assembly 122 and cooling unit 116. In the preferred embodiment, temperature sensors 118 and 123 are each coupled to control unit 106. In the preferred embodiment, when the temperature as sensed by temperature sensor 118 meets or exceeds a maximum freezer compartment temperature, control unit 106 activates cooling unit 116 to cool the air in the freezer compartment. When the temperature as sensed by temperature sensor 123 meets or exceeds a desired refrigerated compartment temperature, control unit 106 activates fan assembly 122 to direct cool air from the freezer compartment to the refrigerated compartment. In addition, cooling unit 116 may also be activated by control unit 106 when fan assembly 122 is activated so that a desired freezer compartment temperature is maintained.

In the preferred embodiment, a maximum refrigerated temperature is set by the driver via control unit 106. Control unit 106 displays the current refrigerated compartment temperature to the driver via a display screen included in control unit 106. The control unit 106 may also display the maximum refrigerated temperature adjacent to the current refrigerated temperature on the display screen of the control unit so that the driver may easily compare the two temperatures to determine if there is a possible problem with the cooling system.

Referring again to FIG. 1, Room temperature compartment 112 is separated from driver area 101 by screen 132. Screen 132 may be a wire mesh or other sturdy form of wire, plastic, rope or other strong and durable material for preventing goods stored in room temperature compartment 112 from intruding on or entering driver area 101. The screen 132 may extend from the floor of the van to the ceiling of the van. In this way, air flows between room temperature compartment 112 and driver area 101 such that room temperature compartment 112 shares the same air with driver area 101. The climate controlled air from vents 124, 126, 128 and 130 is used to maintain a driver comfortable temperature in driver area 101. The air from driver area 101 travels through screen 132 such that the temperature of room temperature compartment 112 is maintained at approximately the same temperature as driver area 101. Vents 124, 126, 128 and 130 are standard heating and air conditioning vents that are commonly included with the delivery van or other vehicle. Although four vents are depicted, more or fewer vents may be used. The room temperature compartment 112 may also include separating wall 114 which divides the room temperature compartment into sub-compartments. Although one separating wall 114 is depicted, no separating walls or multiple separating walls may be used as desired. The separating wall 114 may also be configured to be made adjustable such that the sizes of the sub-compartments may vary. This can be accomplished by using standard type rail systems which allow for easy installation and easy adjustment.

In various embodiments (not shown), the refrigerated compartment, the freezer compartment and the room temperature compartment may include shelves or other compartment dividers, creating subcompartments. In this embodiment, the shelves or dividers may be a screen, mesh or other configuration that allows for the passage of air. In the way, the flow of air within compartments containing subcompartments will not be restricted.

In various embodiments (not shown), the size of the refrigerated compartment, the freezer compartment and the room temperature compartment may be permanently manufactured in various sizes depending on the environmental conditions of the geographic region being served by the delivery vehicle. For example, in a first embodiment, the delivery vehicle may include compartments arranged as depicted in FIG. 1. In a second embodiment, if the environment is a hot weather climate, the refrigerated compartment may be much larger than depicted in FIG. 1. In this second embodiment, referring to FIG. 1, wall 111c may be removed such that refrigerated compartment 110 may extend to include the area between wall 114 and wall 109c. In this second embodiment, wall 114 would extend completely from one side of the delivery vehicle to the other side of the delivery vehicle. In this second embodiment, room temperature compartment 112 may be half the size than as depicted in FIG. 1, or may yet be smaller. In a third embodiment, each of the three compartments may share a dimension in addition to height such that they all extend from one side of the delivery vehicle to the other side of the delivery vehicle. In this embodiment, the room temperature compartment must remain front-most, and either of the refrigerated and freezer compartments may be in the rear-most or middle. Referring to FIG. 1, in this embodiment, wall 114 would extend to the side of the van and wall 121 would not exist. In this embodiment, the shared wall between the refrigerated and freezer compartments would be walls 109c and 111c. In this embodiment, one or more fan assemblies would be placed in the shared wall as discussed above. In this embodiment, at least one door each would be provided to access each of the compartments. In this embodiment, the doors may all be side entry doors such that the compartments are entered from a side of the van, or there may be two side entry doors and one or two rear entry doors. When there are multiple side entry doors, they may be on one side of the delivery vehicle or may be both sides of the vehicle.

Figure 3:
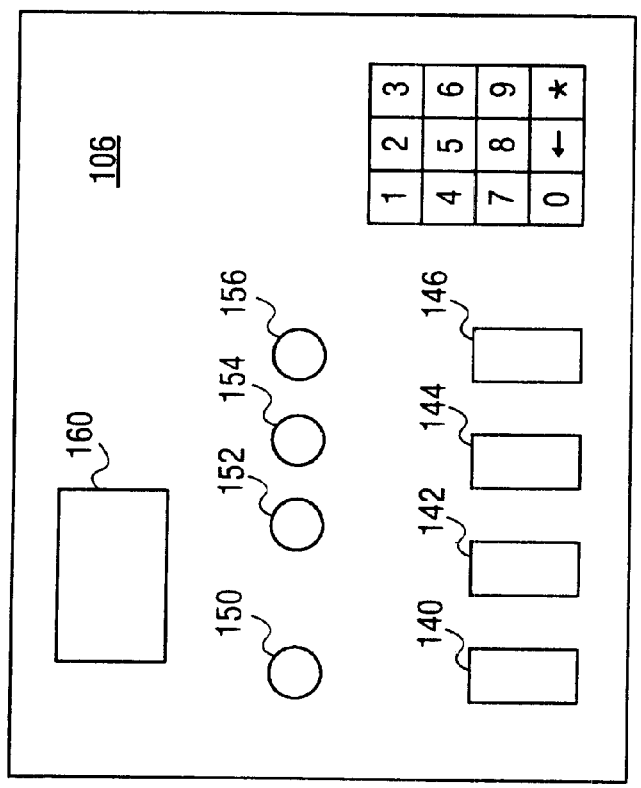
FIG. 3 is a view of the preferred embodiment of a control panel for the present invention.

FIG. 3 is a view of the preferred embodiment of a control panel for the present invention. Control panel 106 may include switches 140, 142, 144, 146, indicator lights 150, 152, 154, 156, display screen 160, and keypad 162. The driver may use control unit 106 to set the maximum freezer temperature and maximum refrigerated temperature by entering numeric information on keypad 162. In another embodiment, maximum freezer temperature and maximum refrigerated temperature may be pre-set such that they are not modifiable by the driver. The driver may use control unit 106 to monitor the temperatures in the freezer compartment and the refrigerated compartment via display screen 160. In such an embodiment, control unit 106 may not include keypad 162. Display screen 160 may be any device which can display temperature and other information to the driver including, but not limited to, liquid crystal display (LCD), light emitting diodes (LED) and thin film transistors (TFT). In yet another embodiment, control unit 106 may include an alarm such as a speaker or other sound emitting device (not shown) for the issuing of audible sound alerts when the temperature in the freezer compartment or the temperature in the refrigerated compartments exceeds a maximum freezer temperature and a maximum refrigerated temperature, respectively. In a further embodiment, the room temperature compartment may include a third temperature sensor (not shown) coupled to control unit 106 such that the temperature in the room temperature compartment is displayed, and/or such that an audible sound alert may issue from the speaker or other sound emitting device when the temperature in the room temperature compartments exceeds a maximum desired temperature.

The switch 140 may be an on/off switch that is used to transition the cooling unit between standby and off modes. The cooling unit includes a blower that may be controlled by switch 142. The switch 142 is a cooling unit blower on/off switch that allows a driver to manually cool the freezer compartment. However, switch 142 may also be a three or four way switch such that the blower of the cooling unit may be set to off, low, mid, and/or high. In the latter embodiment, switch 142 allows for control of the volume of cooled air emitted by the cooling unit. The switch 144 is a cooling unit defrost on/off switch that allows a driver to manually defrost the cooling unit. The switch 146 is a fan assembly on/off switch that allows a driver to manually cool the refrigerated compartment by activating the fan assembly that controls airflow from the freezer compartment to the refrigerated compartment. However, switch 146 may also be a three or four way switch such that the fan assembly may be set to off, low, mid, and/or high. In the latter embodiment, switch 146 controls the volume of cooled air moved from the freezer compartment to the refrigerated compartment. The driver may manually override an automatic cooling system and switch either or both the fan assembly and/or the cooling unit on or off.

In the preferred embodiment, indicator light 150 emits light when the cooling unit is in standby mode, indicator light 152 emits light when the blower of the cooling unit is on, indicator light 154 emits light when the cooling unit is defrosting, and indicator light 156 emits light when the fan assembly is on, moving air from the freezer compartment to the refrigerated compartment.

FIG. 4 is a rear view of the preferred embodiment of a delivery vehicle of the present invention. The van 100 has separate external doors for accessing the freezer compartment, the refrigerated compartment, and the room temperature compartment. In this embodiment, door 170 is an insulated door that provides access to the freezer compartment, and door 180 is an insulated door that provides access to the refrigerated compartment. Doors 170 and 180 are manufactured to similar specifications such that each door includes at least two hinges 172 and a handle 176, and may open outwardly, swinging away from the freezer compartment and the refrigerated compartment. In another embodiment, the doors 170 and 180 may be roll-up doors or any other kind of insulated door suitable for use in a delivery vehicle.

FIG. 5 is a side view of the preferred embodiment of a delivery vehicle of the present invention. Door 190 provides access to the room temperature compartment. The room temperature door is a swing-out hinged door. The room temperature door 190 may also be a sliding door, like those commonly used with vans, such that when the handle is pulled, the door pulls out, away from the vehicle and may be pulled toward the rear of the vehicle a distance approximately equal to the width of the door. Room temperature door 190 may also be a roll-up door. Van 100 also includes two driver area doors 198, one of which is depicted.

In an embodiment in which the cargo area is custom-made, the cargo area includes a roof 178 and side walls 182 and 184, as shown in FIG. 4. In this embodiment, the roof and walls or the cargo area of the van are constructed and formed at generally right angles. Standard, non-custom vans include a roof that is generally formed with the walls by a round or curved connection. By constructing the roof generally perpendicular to the sides such that the connecting point is made at approximately right angles increases the internal square footage of the vehicle, thus increasing the internal cargo-storing area and allowing the custom-made cargo van to carry an increased volume and amount of cargo.

In another embodiment of a custom-made cargo area of a delivery vehicle, the cargo area height 185 may be constructed to equal the driver area height 187 plus the height 189 of an externally mounted freezer condenser unit 194, as shown in FIG. 5. In this embodiment, an internal freezer unit is replaced by the external roof mounted freezer condenser unit. In this embodiment, roof 178 of the cargo area is of a height equal to the height 189 of the freezer condenser unit 194 plus the height 187 of the roof 192 of the cab or driver area. In this embodiment, driver area height 187 is approximately the same as the height of a typical regularly available delivery van. Prior art delivery vans may include an external freezer unit mounted on the roof of the delivery van, but the prior art vans have a roof that is uniform in height throughout, such that the height of the cargo area portion and the driver area portion of the delivery van are the same, as shown by traditional roof 186 and driver area roof 192, both having height 187. By increasing the height of the cargo area of the delivery van from height 187 to height 185, the delivery van has an increased volume and may hold more cargo. Further, the delivery van embodiment of the present invention having an expanded height is designed to not exceed a maximum acceptable height that allows for entering parking garages at most office buildings and apartment buildings. In addition, the height of the delivery van is no greater then traditional vans mounted with an air conditioner.

In yet another embodiment, an internal freezer unit is replaced by an externally mounted freezer condenser unit mounted under the cargo area of the delivery vehicle. In this embodiment, the roof of the cargo area is of a height equal to the height of a freezer condenser unit plus the height of the roof of the cab or driver area. In this embodiment, the height of the driver area is approximately the same as the height of a typical regularly available delivery van or driver area of a generally available truck cab. In this embodiment, the freezer compartment, the refrigerated compartment, and the room temperature compartment are each in the cargo area. As above, there is a fan assembly in a shared wall between the freezer compartment and the refrigerated compartment. In addition, in this embodiment, there is a fan assembly in a second shared wall between the room temperature compartment and the refrigerated compartment. In this embodiment, the cab or driver area is separate from the cargo area. In this embodiment, the driver or other occupant of the van may monitor and control the temperature of the three compartments of the van via a control unit mounted in the cab.

In this embodiment, the driver area may be any readily available light truck or van cab and chassis and such as the Sierra 3500 HD available from the GMC division of General Motors Corporation of Pontiac, Mich. By placing the freezer condenser unit under the vehicle, the height of the cargo area may be increased such that the delivery van has an increased volume and may hold more cargo. Further, the delivery vehicle with expanded height cargo area and external, undermounted freezer condenser unit embodiment is designed to not exceed a maximum acceptable height that allows for entering parking garages at most office buildings and apartment buildings. In addition, the height of the delivery vehicle is no greater than traditional vans mounted with an air conditioner on or just behind the cab area.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A delivery vehicle comprising:
   a freezer compartment;
   a cooling unit to directly cool the freezer compartment;
   a refrigerated compartment adjacent to the freezer compartment, the refrigerated compartment having a shared wall with the freezer compartment, the shared wall having at least one fan assembly to move air from the freezer compartment to the refrigerated compartment;
   a room temperature compartment adjacent to a driver area and sharing air with the driver area; and
   a control unit to allow the driver to monitor and to control the temperature in the freezer compartment and the temperature in the refrigerated compartment from the driver area.

2. The delivery vehicle of claim 1 wherein the temperature of the room temperature compartment is controlled by a delivery vehicle climate control system.

3. The delivery vehicle of claim 1 wherein the cooling unit is located in the freezer compartment.

4. The delivery vehicle of claim 1 further comprising a condenser unit located on a first portion of the roof of the delivery vehicle.

5. The delivery vehicle of claim 4 wherein a second portion of the roof of the delivery vehicle is situated at a height equal to the sum of the height of the first portion of the roof and the height of the cooling unit.

6. A delivery vehicle comprising:
   a driver area having at least one seat, the driver area located toward the front of the van adjacent to a driver door, a windshield and a steering wheel;
   a freezer compartment;
   a refrigerated compartment having a shared wall with the freezer compartment, the shared wall having at least one fan assembly to move air from the freezer compartment to the refrigerated compartment;
   a room temperature compartment located forward of the freezer compartment and the refrigerated compartment, situated immediately behind and adjacent to the driver area, and sharing air with the driver area.

7. The delivery vehicle of claim 6 wherein the room temperature compartment is separated from the driver area by a screen that allows for the passage of air.

8. The delivery vehicle of claim 7 wherein the screen prevents the cargo from encroaching into the driver area.

9. The delivery vehicle of claim 6 further comprising:
   a first door to access the freezer compartment;
   a second door to access the refrigerated compartment; and
   a third door to access the room temperature compartment.

10. The delivery vehicle of claim 6 further comprising:
    a control panel accessible from the driver area.

11. The delivery vehicle of claim 10 wherein the control panel allows for driver control of the temperature in the freezer compartment and driver control of the temperature in the refrigerated compartment.

12. The delivery vehicle of claim 10 wherein the control panel displays the temperature in the freezer compartment.

13. The delivery vehicle of claim 10 wherein the control panel provides for driver control of a cooling unit in the freezer compartment.

14. The delivery vehicle of claim 10 wherein the control panel allows the driver to set a cooling temperature above which the fan assembly is automatically activated.

15. The delivery vehicle of claim 10 wherein the control panel allows the driver to set a freezing temperature above which a cooling unit in the freezer compartment is automatically activated.

16. The delivery vehicle of claim 10 further comprising a first temperature sensor in the refrigerated compartment.

17. The delivery vehicle of claim 16 wherein the first temperature sensor is coupled to a cooling unit in the freezer compartment and the fan assembly.

18. The delivery vehicle of claim 16 wherein the first temperature sensor is coupled to the fan assembly.

19. The delivery vehicle of claim 16 wherein the first temperature sensor is coupled to the control panel.

20. The delivery vehicle of claim 16 wherein the control panel displays the temperature in the refrigerated compartment.

21. The delivery vehicle of claim 10 wherein the control panel comprises a switch that allows the driver to control the fan assembly.

22. The delivery vehicle of claim 21 wherein the control panel is coupled to the fan assembly.

23. The delivery vehicle of claim 16 further comprising a second temperature sensor in the freezer compartment.

24. The delivery vehicle of claim 23 wherein the second temperature sensor is coupled to a cooling unit in the freezer compartment.

25. The delivery vehicle of claim 23 wherein the second temperature sensor is coupled to the control panel.

26. The delivery vehicle of claim 23 wherein the control panel displays the temperature in the freezer compartment.

27. The delivery vehicle of claim 26 wherein the control panel comprises a switch that allows the driver to control the cooling unit.

28. The delivery vehicle of claim 7 wherein the temperature in the room temperature compartment and the temperature in the driver area are approximately the same.

29. The delivery vehicle of claim 7 wherein the temperature in the room temperature compartment is maintained by a climate control system of the delivery vehicle.

\* \* \* \* \*